(12) United States Patent
Brobeil et al.

(10) Patent No.: US 8,464,595 B2
(45) Date of Patent: *Jun. 18, 2013

(54) METHOD FOR MANUFACTURING A PLASTIC, ESPECIALLY A POLYURETHANE, AS WELL AS METHOD FOR MANUFACTURING, WITH SUCH PLASTIC, A LINER FOR A MEASURING TUBE OF AN IN-LINE MEASURING DEVICE

(75) Inventors: Wolfgang Brobeil, Weil am Rhein (DE); Sven Aenishänslin, Maisprach (CH); Johannes Ruchel, Arlesheim (CH); Alexander Stünzi, Ettingen (CH)

(73) Assignee: Endress + Hauser Flowtec AG, Reinach (CH)

( * ) Notice: Subject to any disclaimer, the term of this patent is extended or adjusted under 35 U.S.C. 154(b) by 1113 days.

This patent is subject to a terminal disclaimer.

(21) Appl. No.: 11/523,532

(22) Filed: Sep. 20, 2006

(65) Prior Publication Data

US 2007/0093633 A1 Apr. 26, 2007

Related U.S. Application Data

(60) Provisional application No. 60/718,308, filed on Sep. 20, 2005.

(30) Foreign Application Priority Data

Sep. 20, 2005 (DE) .......................... 10 2005 044 972

(51) Int. Cl.
*G01F 1/58* (2006.01)
(52) U.S. Cl.
USPC ..................................... 73/861.12; 73/861.11
(58) Field of Classification Search
USPC .................. 528/44; 524/789, 701; 73/861.12, 73/861.11
See application file for complete search history.

(56) References Cited

U.S. PATENT DOCUMENTS

| 5,567,763 | A | * | 10/1996 | Madan et al. | ................. | 524/701 |
| 5,648,421 | A | * | 7/1997 | Thiele et al. | ................. | 524/789 |
| 2006/0162465 | A1 | * | 7/2006 | Sulzer et al. | ............... | 73/861.12 |

FOREIGN PATENT DOCUMENTS

| DE | 108 103 | 9/1974 |
| DE | 41 40 644 A1 | 6/1993 |

(Continued)

*Primary Examiner* — Michael L Leonard
(74) *Attorney, Agent, or Firm* — Bacon & Thomas, PLLC

(57) ABSTRACT

A plastic is manufactured on the basis of at least four starting components (A, B, C, F) of which at least a first primary component (A) and a second primary component (B) can react with one another. A chemical reaction of the two primary components (A, B) is accelerated in such case by addition of at least one secondary component (C) serving as a catalyst. Additionally, according to the method, a tertiary component (F) serves as a filler, especially a color-giving filler. Initially a first multicomponent system (BF; CF; BCF), especially also a storable system, serving as an intermediate component, is formed, which contains, at least in part, both the secondary component (C) as well as also the tertiary component (F). Additionally, on the basis of the first multicomponent system (BF; CF; BCF) a flowable, especially liquid, second multicomponent system (ABCF) is formed, which contains the four starting components (A, B, C, F) in concentrations enabling the chemical reaction of the primary components (A, B). The plastic is finally formed by means of the second multicomponent system in that the therein contained primary component (A) and the therein contained second primary component (B) are allowed to react, at least partially, with one another. By applying the second multicomponent system (ABCF) onto an inner wall of a support tube, especially a metal support tube, serving as a component of an in-line measuring device, a liner internally coating the support tube can be formed from this plastic in simple manner.

20 Claims, 2 Drawing Sheets

FOREIGN PATENT DOCUMENTS

| | | |
|---|---|---|
| DE | 44 42 353 A1 | 5/1996 |
| DE | 198 23 843 A1 | 12/1999 |
| DE | 100 44 712 A1 | 3/2002 |
| DE | 101 52 310 A1 | 5/2003 |

* cited by examiner

METHOD FOR MANUFACTURING A PLASTIC, ESPECIALLY A POLYURETHANE, AS WELL AS METHOD FOR MANUFACTURING, WITH SUCH PLASTIC, A LINER FOR A MEASURING TUBE OF AN IN-LINE MEASURING DEVICE

This application claims priority under 35 USC §119 (a)-(d) of German Patent Application No. 10 2005 044 9072.7, filed Sep. 20, 2005.

FIELD OF THE INVENTION

The invention relates to a method for manufacturing a plastic, especially a polyurethane. Furthermore the invention relates to a method for manufacturing a liner of such plastic for a measuring tube of an in-line measuring device, especially one having a magneto-inductive, measurement pickup, or transducer.

BACKGROUND OF THE INVENTION

It is known to use in-line measuring devices containing a magneto-inductive, measurement pickup for measuring the flow velocity and/or volume flow, e.g. volume flow rate, of an electrically conductive fluid flowing in a stream direction through a measuring tube of the measurement pickup. For this, the magnetically inductive sensor uses, mostly, diametrically facing, field coils of a magnetic circuit arrangement electrically connected to an exciter electronics of the in-line measuring device, to produce a magnetic field, which passes through the fluid within a given measuring volume at least sectionally perpendicularly to the direction of flow and which closes on itself essentially externally of the fluid. The measuring tube is composed, for such purpose, usually of non-ferromagnetic material, so that the magnetic field is not unfavorably affected. Due to the movement of the free charge carriers of the fluid in the magnetic field, an electrical field is produced in the measuring volume that runs perpendicularly to the magnetic field and perpendicularly to the direction of flow of the liquid, according to the magneto-hydrodynamic principle. An electrical voltage induced in the fluid is therefore measurable by means of at least two measurement electrodes spaced from each other in the direction of the electrical field, and by means of an evaluation electronics of the in-line measuring device connected to these electrodes. The induced voltage is, in turn, a measure for the volume flow rate. Serving for sensing the induced voltage can be, for instance, fluid-contacting, galvanic, or fluid-non-contacting, capacitive measurement electrodes. For conveying and coupling the magnetic field into the measurement volume, the magnetic circuit arrangement generally includes coil cores surrounded by the field coils. The coil cores are separated from each other, especially diametrically, along a periphery of the measuring tube, and are arranged with, in each case, a free end face located especially at positions where each is, in effect, a mirror image of the another. In operation, the magnetic field created by the field coils connected to the exciter-electronics is so coupled via the coil cores into the measurement tube, that it passes through the fluid flowing between the two end faces at least sectionally perpendicularly to the stream direction. Because of their high measuring accuracy, on the one hand, and the versatile applicability on the other hand, especially also in almost all usual nominal diameters, in-line measuring devices with such measurement pickups have become established over decades in almost all domains of industrial measurement technology. In-line measuring devices that measure flow velocities, and/or volume flow rates, of flowing fluids acoustically by means of ultrasonics, are often used as an alternative to such in-line measuring devices with magneto-inductive measurement pickups, at least in the case of non-conductive media.

Due to the required high mechanical stability demanded for measuring tubes used in such measurement pickups, the former—both for magneto-inductively, as well as for acoustically, measuring, measurement pickups—comprise most often an outer, especially metal, support tube of predetermined strength and diameter, coated internally with an electrically non-conductive, insulating material of predetermined thickness, the so-called liner. For example, the magneto-inductive measurement pickups described in U.S. Pat. No. 6,595,069, U.S. Pat. No. 5,664,315, U.S. Pat. No. 5,280,727, U.S. Pat. No. 4,679,442, U.S. Pat. No. 4,253,340, U.S. Pat. No. 3,213,685 or JP-Y 53-51 181 comprise, in each case, a measuring tube insertable fluid-tightly into a pipeline, and having a first, inlet end and a second, outlet end. The measuring tube, in each case, is comprised of a non-ferromagnetic support tube, as an outer casing of the measuring tube, and a tubular liner, accommodated in a lumen of the support tube and made of an insulating material, for conveying a flowing liquid isolated from the support tube The liner, which is usually made of a thermoplastic, thermosetting or elastomeric plastic, or synthetic material, serves to chemically isolate the support tube from the fluid. In the case of magneto-inductive measurement pickups, wherein the support tube has a high electrical conductivity, for example through the use of metal support tubes, the liner serves also as electrical isolation, or insulation, between the support tube and the fluid, in order to prevent a short circuiting of the electrical field through the support tube. By a suitable design of the support tube, it is thus possible to adapt the strength of the measuring tube to the mechanical loads in particular application cases, while an adaptation of the measuring tube to the chemical and/or biological requirements of particular applications can be realized by means of the liner.

Because of its good workability, on the one hand, and its good chemical and mechanical properties, on the other hand, polyurethane in particular has become established as a material for liners of in-line measuring devices, in particular those with magneto-inductive measurement pickups. This is in addition to hard rubber or fluorine-containing plastics such as PTFE or PFA. Furthermore, liners of polyurethane have mostly good biological properties, in particular also in bacteriological regard, and are, as a result, also suitable for application in the case of aqueous fluids.

The polyurethanes used for the production of liners of the described kind are mostly elastomeric plastics, that are made on the basis of a flowable, especially liquid, multi-component system formed, directly before the processing, of reactive starting components. After the mixing, the obtained, multi-component system is applied onto the inner wall of the support tube pretreated with adhesive agent and left there to harden, or cure, to the liner within a predetermined reaction time. It is well known that polyurethanes are made by the polyaddition method from di- and poly-isocyanates and di- or poly-valent alcohols, for example butanediol. In such case, prepolymers, developed from aliphatic and/or aromatic ether- and/or ester-groups, as well as glycol- and isocyanate groups, can, for example, serve as a primary components that can react with the di- or poly-valent alcohol, supplied as a further primary component. As required, color-giving fillers, especially powdery or pasty ones, for example soot, pigments or reactive dyes can be added.

Used for the manufacture of liners of polyurethane is a so-called ribbon flow method, in which the previously prepared, flowable, multi-component system is evenly distributed on the appropriately moved, inner wall of the support tube by a corresponding pour, or spray, head of an application device, for example a low pressure or high pressure metering/mixing/pouring device. The necessary reaction time for the subsequent solidifying and hardening of the multi-component system can be set by the dosage of the starting components, and also, to a large extent, by a suitable controlling of the processing temperature. However, short reaction times of less than a minute, which are necessary for cost-effective production of the liner with a processing temperature of about room temperature, are obtained usually only through addition of a suitable catalyst, usually one containing heavy metal and/or amine, to the multi-component system. Here, in particular, tertiary amines and/or mercury are used as catalysts.

Considering that the catalyst itself remains essentially unchanged in the finished polyurethane, the latter has, as a result, inevitably also toxic, or at least physiologically not completely harmless, characteristics. Numerous investigations have also shown that especially such catalysts can, to a significant degree, be dissolved out of the liner, at least in the presence of water. As a result, the polyurethanes prepared with such catalysts used at present in in-line measuring devices are only suitable conditionally for applications with high hygienic requirements, e.g. for measurements in the field of drinking water, since high requirements for the chemical resistance of the fluid-touching components in the drinking water field and the physiological compatibility can, without more, no longer be fulfilled. Special attention in the drinking water field is placed on, among other things, meeting the maximal tolerable rate of migration ($M_{max,\ TOC}$) regarding a total organic carbon content (TOC) and/or the specific migration limit values (SML) defined for toxicologically critical substances. Equally strict are the requirements regarding the effect of the liner on the external properties of drinking water, especially regarding the taste-, color-, turbidity- and/or smell-neutrality of the liner in the presence of water, as well as regarding the maximally tolerable chlorine demand rates ($_{Mmax,Cl}$). Fortunately, beyond that, the possibility exists, as for example suggested in the not before-published German patent application DE 102005005195.2, to use as catalysts metal-organic compounds such as e.g. di(n-octyl)tin dilaurate. This has, among other things, the advantage that the polyurethane manufactured therewith has good physiological, organo-leptic and bacteriological characteristics and can thus also be quite suitable for applications in the drinking water field.

Because of the short reaction time set by means of the catalyst, the final blending of all the components used for the production of the multi-component system can thus however inevitably take place only immediately before the application of the multi-component system onto the support tube, for example through the use of in-line mixers. Considering, however that the catalyst, based on the entire multi-component system, generally constitutes only a very small volume, or mass, fraction of less than one percent, in the fabrication of such polyurethane liners, in an intermediate step of the manufacturing process, generally the catalyst, which, at least as regards quantity, serves as a secondary component, is mixed into the alcohol in concentration figured on the basis of the entire multi-component system, whereby a catalyst-alcohol mixture serving practically as an intermediate component of the multi-component system is formed from the two starting components alcohol and catalyst. The mixture, composed, at least, of the alcohol and the catalyst, formed in this way, is placed for subsequent use, in an appropriate storage container of the application apparatus specified above and held there in an amount, for example 20-50 liters, sufficient for the actual manufacturing of a series of liners.

In the production of the described measurement pickups in small and medium numbers, the output rate can lie for example in an order of magnitude of approximately 50-100 pieces per day, from which would result, depending on nominal width of the measuring tube, approximately 0.5-3 kg of the multi-component system per measurement pickup, a daily requirement for such catalyst-alcohol-mixtures between approximately 0.5 kg and about 2 kg. Due to the stored mixture of alcohol and catalyst, it is thus achieved that also the catalyst, especially also in the case of application of only very small amounts of the multi-component system, can be precisely measured in the final blending of all components with defendable technical complexity. Further, the multi-component system can in this way be mixed using a reduced number of storage containers compared to the total number of nominally used starting and/or intermediate components and by means of less branched, and, as a result, more simply built in-line mixers.

It has, however, been found that, in the use of such catalyst-alcohol-mixtures manufactured in advance, depending on composition, the case can arise that these can be quite highly reactive, and, as a result, chemically unstable, especially when using organo-metallic catalysts. This can especially be attributed to alcoholysis and/or solvolysis reactions occurring in such mixtures, as elaborated, for instance, in the article "Solvolytic Degeneration of Aliphatic Polyesteroligomers: Poly(Tetramethylene Adipate) Diol", Mormann W., Wagner J., Laboratorium für Makromolekulare Chemie der Universität-GH Siegen (Laboratory for Macromolecular Chemistry, Siegen University-institute), FB (Faculty Branch) Aug. 8, 1987. Thus, for example, corresponding decay times of less than two days were experimentally determined for catalyst-alcohol-mixtures based on butanediol and di(n-octyl)tin dilaurate. Therefore, charges of such catalyst-alcohol-mixtures correspondingly mixed in advance for the production of polyurethane cannot always be kept over longer timeframes of preferably more than two weeks, technologically meaningful for the manufacturing process of liners. Inversely, the recurring daily requirement of such catalyst-alcohol-mixtures, for example in the production of the initially mentioned magneto-inductive measurement pickup, can be estimated only very inaccurately. This in particular also, because, for example, measurement pickups of the described kind are essentially manufactured "just-in-time" and thus the respective production process, especially also the manufacturing of the liner, is often done in the realm of short deadlines. Consequently, the production rate of measurement pickups per day and thus also the quantity of multicomponent system to be processed each day can vary to a significant extent, wherein the spread can, by all means, lie in the range of 100% or more. Thus, it can be a problem with the production and processing of multicomponent systems of the described kind using catalyst-alcohol-mixtures to have, on the one hand, always a charge of a sufficient quantity of the utilized catalyst-alcohol-mixture for the started production is always available, and, on the other hand, however, to consume this charge within a few days, in order, surely, to be able to avoid a decomposition while in the application apparatus and to prevent a rejected production otherwise caused thereby.

In view of the fact that the production process for such measurement pickups must be flexible to a high degree and consequently the daily requirement for the multicomponent system can be exactly assessed in advance only on a short timeframe, a disadvantage of catalyst-alcohol-mixtures of the described kind is to be seen in the fact that the available charge is measured almost inevitably either too large, wherein the surplus resulting from it is very complex and accordingly expensive to ultimately dispose of as hazardous waste, or as a result of insufficiently measured charge size an increasing need of measurement pickups in a short timeframe cannot be covered without special effort. Furthermore, a further disadvantage of such catalyst-alcohol-mixtures consists also of the fact that the application apparatus is to be cleaned unavoidably before each filling with a new charge, and thus is to be cleaned with much effort practically every day, in order to avoid an influencing of its chemical characteristics by possible residue of the expired catalyst-alcohol-mixture.

SUMMARY OF THE INVENTION

A object of the invention is, therefore, to improve the production of multicomponent systems of the described kind to that effect that, on the one hand, the catalyst is exactly doseable, or meterable, even in the case of use of only very small concentrations, and, on the other hand, the intermediate components containing the catalyst, used for the multicomponent system, are chemically sufficiently stable, especially also storable. As a result, a further object of the invention is also directed toward improving the production of liners for measurement pickups of the described kind, such that, on the one hand, a sufficient buffering of the production process can be achieved, such that it becomes possible to react flexibly even with fluctuations in the output rate, and that, on the other hand, both as small a rejection rate as possible can be experienced with the liners and also as small a surplus rate as possible can be achieved with the used starting components, especially also the intermediate components. Moreover, the liner should be able to meet as much as possible the high chemical-biological and hygienic requirements set for drinking water applications.

To achieve these objects, the invention includes a method for manufacturing a plastic, especially a polyurethane, on the basis of at least four starting components, of which at least a first primary component—for example a prepolymer—and a second primary component—for example a bivalent alcohol—are capable of reacting with one another, wherein a chemical reaction of the two primary components is accelerated with the addition of at least one secondary component that serves as a catalyst—for example an organotin compound or another organometal compound, and wherein at least one tertiary component—for example a reactive dye, or a pigment serving as an, especially colorgiving, filler. The method of the invention includes, in such case, a step of forming an, especially also storable, first multicomponent system that serves as an intermediate component, containing both the secondary component and the tertiary component, at least in part. Furthermore, the method according to the invention includes a step of forming, in part from the first multicomponent system, a flowable, especially liquid, second multicomponent system, that contains each of the four starting components in a concentration enabling, especially favoring, the chemical reaction of the two primary components, as well as a step of forming the plastic by means of the second multicomponent system, by allowing at least the primary components contained therein to react, at least partially, with one another.

According to a first embodiment of the invention, the step of forming the first multicomponent system further includes a step of bring secondary and tertiary components together.

According to a second embodiment of the invention, the step of forming the first multicomponent system further includes a step of bringing at least a portion of the second primary and tertiary components together.

According to a third embodiment of the invention, the step of forming the first multicomponent system further includes a step of bringing secondary and tertiary components, as well as at least a portion of the second primary component, together. According to a further development of this embodiment of the invention, this step effects the bringing of secondary and tertiary components, as well as at least a portion of the second primary components, together, after at least a portion of the second primary component and the tertiary component have been mixed together.

According to a fourth embodiment of the invention, the step of forming the second multicomponent system further includes a step of, especially simultaneously, bringing the first multicomponent system together with the two primary components.

According to a fifth embodiment of the invention, the step of forming the second multicomponent system further includes a step of, especially simultaneously, adding the first primary component as well as the second primary component to the first multicomponent system.

According to a sixth embodiment of the invention, the method further includes steps of placing at least one charge of the first multicomponent system in a storage container and taking from the at least one charge to form a plurality, especially a sequence, of portions of the second multicomponent system by means of volume portions taken from the charge of the first multicomponent system. According to a further development of this embodiment of the invention, the placed charge of the first multicomponent system is used over a time period of more than three days to form portions of the second multicomponent system.

According to a seventh embodiment of the invention, the method further includes steps of applying at least a volume portion of the second multicomponent system onto the inner wall of an, especially metal, support tube to serve as a component of an in-line measuring device, as well as producing, by means of the second multicomponent system applied on the inner wall of the support tube, a plastic-liner internally coating the support tube, by allowing the first and second primary components contained in the second multicomponent system to react within the support tube at least partially with one another.

According to an eighth embodiment of the invention, at least 24 hours, especially more than three days, elapse between the step of forming the first multicomponent system and the step of forming the second multicomponent system.

According to a ninth embodiment, the first primary component contains, especially aliphatic and/or aromatic, ether-groups.

According to a tenth embodiment, the first primary component contains aromatic or aliphatic isocyanate-groups.

According to an eleventh embodiment, the first primary component contains reactive NCO-groups.

According to a twelfth embodiment, the second primary component contains functional OH-groups.

According to a thirteenth embodiment, the second primary component comprises a diol, especially a butanediol.

According to a fourteenth embodiment, the secondary component contains organometal compounds formed from a physiologically harmless metal, e.g. organotin compounds or the like.

According to a fifteen embodiment, the secondary component contains organotin compounds, especially, di(n-octyl)tin compounds.

According to a sixteenth embodiment, the secondary component is a di(n-octyl)tin dilaurate and/or a di(n-octyl)tin dimalinate.

According to a seventeenth embodiment, the tertiary component contains functional OH-groups.

According to an eighteenth embodiment, the tertiary component contains an, especially liquid or pasty, reactive colorant. In such case, it can be for example Reactint® Black X95AB colorant, as it is presently offered by the company Milliken Chemical, division of Milliken & Company, Spartanburg, S.C., US for coloring polyurethane.

According to a nineteenth embodiment, the tertiary component contains a pigment colorant. According to a further development of this embodiment of the invention, the tertiary component contains, especially powdered, carbon particles and/or soot particles. In such case, it can be, for example, PRINTEX® F 80 of the firm Degussa AG, Düsseldorf, DE or also another black pigment.

A basic idea of the invention is, on the one hand, to mix the catalyst, which is needed for the manufacture of liners of polyurethane in only very limited concentration, initially with a starting component likewise needed for the manufacture in larger charge sizes, in order, in this way, to enable a simplified metering at reasonable effort, taking into consideration the practical aspects of the production. On the other hand, a basic idea of the invention is to develop the thus obtained intermediate component in such a manner that it is storable as much as possible over a sufficiently large length of time, from the production point of view, of at least about three days, possibly, however, for several weeks. This is achieved in the provided method in simple manner by mixing the catalyst with the filler in the extremely low concentration and accordingly in the only very small amounts needed, as referenced to the correct concentration ratios of the final multicomponent system. The invention rests in such case on, among other things, the surprising discovery that the so obtained, intermediate component composed at least of the catalyst and the filler is chemically very stable, especially also in comparison to the catalyst-alcohol mixture mentioned above. As a result of this, such intermediate component can also be stored over the course of several days and accordingly can also be used over a longer period of time for the manufacture of the desired plastic, especially for the manufacture of liners of the described kind.

An advantage of the invention is, among other things, that the catalyst can be very accurately metered in spite of the required very small concentration. As a result of this, liners of the described kind can, without more, also be manufactured with very short fabrication times and at relatively low working temperatures of less than 100° C., especially at about 25° C., with high quality and very good reproducibility.

Another advantage of the invention is also to be seen in the fact that volume portions withdrawn from the compounded material contained in the storage container can be repeatedly replaced practically at any time, especially also then, when residues of the compounded material originally placed in the storage container of the first multicomponent system remain in the storage container.

BRIEF DESCRIPTION OF THE DRAWINGS

The invention and advantageous embodiments will now be explained in greater detail on the basis of the figures of the drawing. Equal parts are provided in the figures with equal reference characters. In case conducive for overviewability, however, reference characters are omitted in subsequent figures. The figures of the drawing show as follows.

DETAILED DESCRIPTION OF EXEMPLARY EMBODIMENTS

Figure 1:
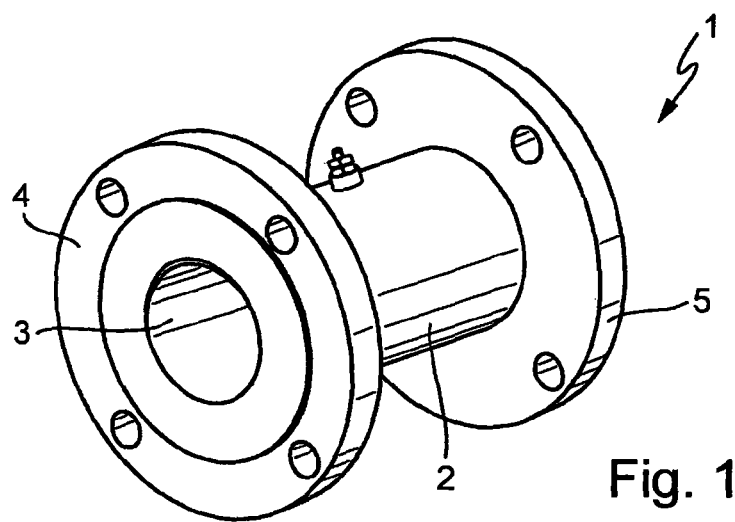
FIG. 1 prospectively in a side view, a measuring tube for an in-line measuring device, especially a magneto-inductive in-line measuring device.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

Figure 2:
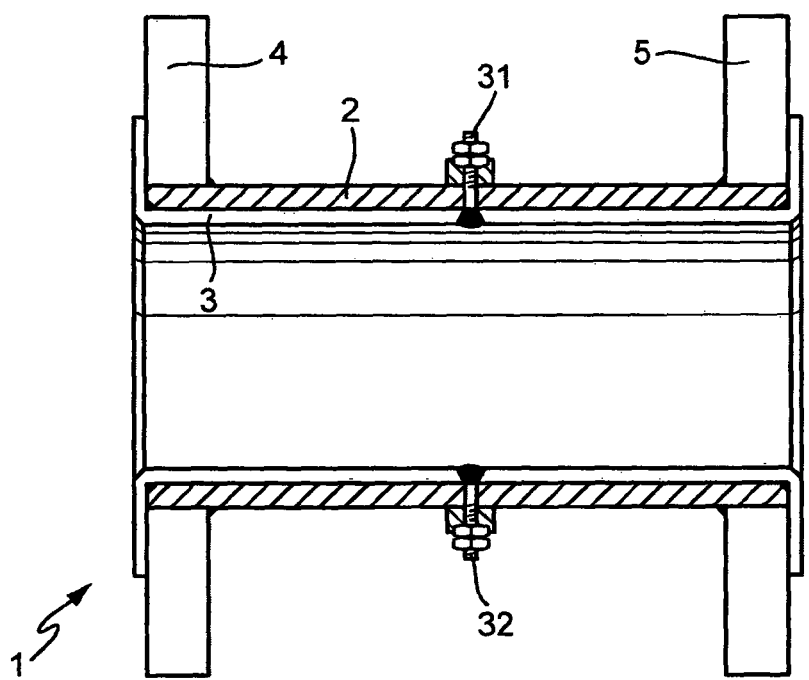
FIG. 2 in a longitudinal section, the measuring tube of FIG. 1.

FIGS. 1 and 2 show in different views a measuring tube for a measurement pickup of an in-line measuring device serving for measuring a fluid flowing in a pipeline (not shown), for example for measuring its flow velocity and/or its volume flow rate. The in-line measuring device can be, for example, a magneto-inductively measuring flow measuring device or one acoustically measuring on the basis of ultrasound. Especially, the in-line measuring device is intended for use in drinking water networks.

Measuring tube 1 includes a support tube 2, especially one of metal, of predetermined lumen, and a plastic, tubular liner 3 of predetermined diameter. The support tube 2 is made of a nonferrous, magnetic material, such as e.g., high grade steel, especially a stainless, high-grade steel or another stainless metal, and coaxially surrounds the liner 3, so that the liner internally, completely coats the support tube 2 and, as a result, practically completely isolates the support tube 2 the fluid flowing therethrough during operation. The measuring tube 1 can be provided, for example, for use in an in-line measuring device having a magneto-inductive measurement pickup or transducer. In accordance with this, the measurement pickup includes, additionally: a magnetic circuit arrangement situated at the measuring tube for producing and conveying a magnetic field, which induces in the flowing fluid (here an electrically conductive fluid) an electric voltage; and measuring electrodes for tapping voltages induced in the flowing fluid.

The magnetic circuit arrangement has, usually, two field coils, which, during measuring operation, are connected with an exciter electronics (not shown) of the in-line measuring device serving for producing varying electrical currents of predetermined current strength. At least at times, a corresponding exciter current flows through the two field coils. The magnetic field produced thereby passes through the fluid flowing inside of the measuring tube 1, at least sectionally perpendicularly to its stream direction. For tapping the electric voltage induced in the flowing fluid, the measurement pickup includes a sensor arrangement applied to the measuring tube 1. The sensor arrangement includes first and second measuring electrodes 31, 32. These lie diametrically opposite one another, with a diameter of the measuring tube 1 imaginarily connecting the measuring electrodes running perpendicular to a diameter of the measuring tube 1 imaginarily connecting the field coils. Of course, the measuring electrodes 31, 32 can, if necessary, especially in the case where there are more than two measuring electrodes, be arranged on the measuring tube 1 so with respect to one another that they do not lie diametrically opposite one another. This can, for example, be the case, when additional measuring electrodes are provided for reference potentials or when, in the case of horizontal installation of the measuring tube 1, measuring electrodes are provided for monitoring to assure a minimum fill level of the fluid in the measuring tube 1. For fluid tight joining into the pipeline, the measuring tube 1 additionally includes, on a first measuring tube end, a first flange 4, and, on a second measuring tube end, a second flange 5. Support tube 2 and flanges 4, 5, are each of circular crossection.

In the manufacture of the measuring tube 1 itself, first the support tube 2 is provided in a desired length, and the metal flanges 4, 5 are correspondingly prepared. Then, onto each end of the support tube 2, one of the flanges 4, 5 is inserted over its outer diameter. Thereupon, the respective rear sides of the metal flanges 4, 5 are mechanically, securely, and hermetically connected with the outer diameter of the support tube 2. This can be done in the case of a metal support tube and metal flanges, for example, by soldering, brazing or welding, this leading to a corresponding solder, braze or weld seam 6. The intermediate space formed between the flanges 4, 5 and the support tube 2 can, as usual, especially in the case of magneto-inductive measurement pickups, be closed by a surrounding sheet of material. The intermediate space can, for the case in which the measuring tube is to be used for a magneto-inductive measurement pickup, serve, for example, for accommodating the mentioned field coils producing the magnetic field and for accommodating further components. When the sheet of material is, in such case, to serve as a component of the magnetic circuit, it is preferably embodied ferromagnetically.

Following the prefabrication of the support tube 2, the liner 3 made of plastic is prepared. Liner 3 is, in one embodiment of the invention, of polyurethane. Especially also usable for the material of liner 3 is e.g. a polyurethane which contains aliphatic and/or aromatic, ether groups. Alternatively or in supplementation thereof, also, for example, a polyurethane can be used which contains aliphatic and/or aromatic, ester groups.

For manufacturing the liner, especially in the case of use of polyurethane for the liner, at least four starting components A, B, C, F are needed, of which at least a first primary component A and a second primary component B are capable of reacting with one another. In the case of the first primary component A, this can be, as is usual in the manufacture of polyurethane, for example, a prepolymer, while the second primary component B can be, for example, a divalent alcohol. As is known, the chemical reaction of the two primary components (in this case the chemical reaction is a polyaddition) is accelerated by addition of at least one secondary component C serving as catalyst. The catalyst can, in such case, be, for example, an organotin compound or another organometal compound. Used as a further starting component (here designated as the tertiary component F) are, finally, fillers, especially fillers which provide color. This can, for example, be a reactive colorant or a pigment colorant e.g. containing carbon particles or composed thereof. Especially for the case in which the plastic used for the liner comprises a polyurethane, for example, use of the reactive colorant Reactint® Black X95AB has proven itself, such being currently available from the firm Milliken Chemical, a subsidiary of Milliken and Company, Spartanburg, S.C., USA, for the coloring of polyurethanes. However, also the use of black pigment, for example PRINTEX® F 80 of the firm Degussa AG, Düsseldorf, DE, has proven to be very advantageous for the manufacture of liners of the described kind.

Since the catalyst is only needed in very limited concentration for manufacture of the liner, initially a first multicomponent system, especially a storable such system, serving as an intermediate component is formed, which contains, at least in part, both the catalyst (serving here as the secondary component C) and also the filler (serving here as the tertiary component F). It has further been found that, for the case in which a reactive colorant is selected as the tertiary component F, the first multicomponent system can contain also already a portion of the alcohol serving in the example of an embodiment as the second primary component B, without reducing, in unsupportable measure, the chemical storability of the multicomponent system, especially, however, the activity of the catalyst contained therein.

The liner 3 is finally produced using the first multicomponent system by forming a flowable, especially liquid, second multicomponent system ABCF, which contains each of the four starting components, thus the two primary components A, B, as well as the secondary and tertiary components C, F (in a concentration enabling the chemical reaction of the two primary components A, B) and by applying this second multicomponent system ABCF onto the lumen of the supporting tube 2 and there allowing the primary components A, B contained therein to react, with the help of the catalyst, at least partially with one another to form the plastic (here the polyurethane). Preferably, concentration and amount of the added, starting components are in such case so measured that the multicomponent system ABCF applied to the supporting tube 2 becomes sufficiently rigid within a relatively short reaction time of less than one minute, especially under thirty seconds and at a working temperature of less than 100° C., for example, at about 25° C., such that it can no longer flow. Then the support tube 2 is stored in suitable manner to let the plastic completely react and, as a result, also to cure completely up to a predetermined end strength. It is, however, to be noted here that the required lengths of time for the solidifying, complete reacting and curing of the plastic, can, in each case, be separately optimized both by the metering of the starting components of the multicomponent system ABCF and additionally, indeed, also by a suitable control of the working and/or storage temperatures. Especially the storage temperature for the individual primary components, as well as for the first multicomponent system serving as the intermediate component, can lie, advantageously, about between 50 and 100° C.

In an embodiment of the invention, the essentially liquid, multicomponent system ABCF is applied to the inner wall of the support tube 2 using, in the so called ribbon flow method, a pouring, or spraying, head movable inside the lumen of the support tube 2, with the requisite starting components being finally mixed with one another, essentially immediately before the application, by means of a pouring or spraying head of a corresponding application equipment, for example, a low pressure or a high pressure metering, mixing, pouring plant. The mixing occurs in such case not only timewise immediately before the application, but also most often also spatially immediately before or directly in the said pouring or spraying head, in order to achieve an as short as possible residence time of the second multicomponent system ABCF in the application equipment. By simultaneous rotating of the support tube 2 about its longitudinal axis and moving of the pouring, or spray, head essentially parallel to the longitudinal axis, the multicomponent system ABCF, flowable at least over a sufficiently long length of time, can be distributed in a very simple and well reproducible manner, not only covering the surface, but, also, in predetermined manner, essentially uniformly over the entire inner wall.

Figure 3:
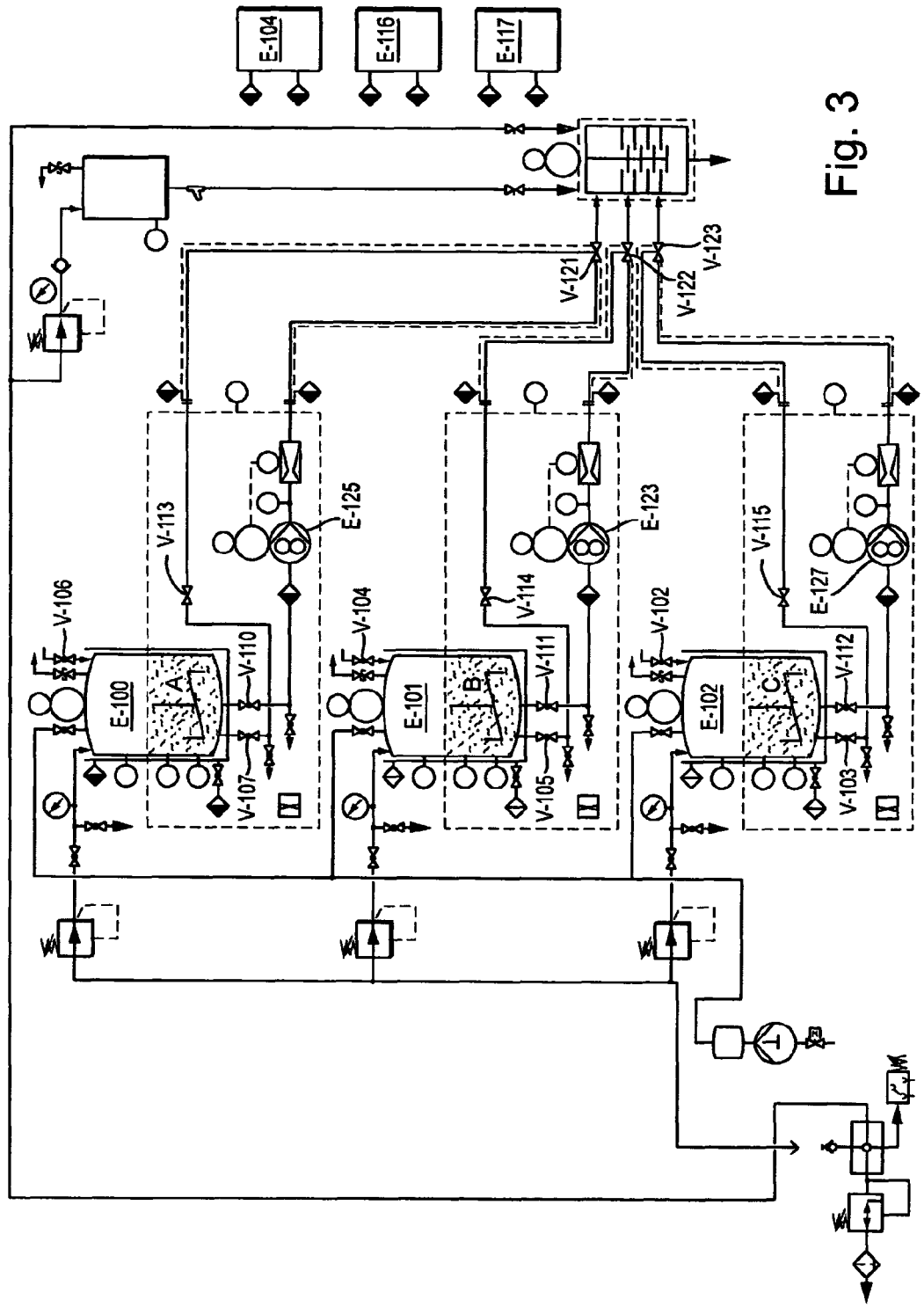
FIG. 3 application equipment for liquid, multicomponent systems suited for implementing the method of the invention and developed as a metering, mixing, pouring plant.

FIG. 3 shows schematically an example of an embodiment of the aforementioned application plant, including three storage containers of which a first storage container E-100 is provided for receiving a charge of the first primary component A, a second storage container E-101 for the reception of a charge of the second primary component B and a third storage container E-102 for receiving a charge of the first multicomponent system CF, BF, or BCF, as the case may be, serving as the intermediate component. Advantageously, each of the three storage containers E-100, E-101, and/or E-102 is provided internally with a stirrer for the repeated recirculation of the components stored, in each case, therein, as well as an external heating apparatus E-104, E-116, or E-117, as the case may be, serving for their temperature control. The storage containers E-100, E-101, E-102 are connected to the pour, or spray, head via corresponding fluid lines, as well as control valves V-104 . . . V-107, V-110 . . . V-115, V-121 . . . V-123 inserted correspondingly into their courses, and pumping devices E-123, E-125, E-127. In an advantageous embodiment, the flowpaths formed for the individual components by the fluid lines, as well as the, in each case, valves and pumps incorporated therein, are implemented, in each case, in a manner such that the media conveyed therein can recirculate, during possible pause times, in their own circulatory paths within the application plant.

According to a further embodiment of the invention, initially at least one charge of the first multicomponent system is placed in a suitable storage container, especially a storage container of the aforementioned application equipment. This at least one charge can then subsequently be used for forming a number, especially a sequence, of portions of the second multicomponent system by means of a volume portion withdrawn from the charge of the first multicomponent system. The size of the at least one charge is, in such case, advantageously so selected that the so provisioned, stored quantity of first multicomponent system can cover e.g. a multiple of the daily need of the associated application equipment. However, the volume portion withdrawn from the charge placed in the storage container can be repeatedly replaced practically at any time, for example, even when residue from the originally provisioned charge of the first multicomponent system is still present in the storage container.

In the manufacture of the first multicomponent system, there are a number of possibilities as regards its extent and/or the sequence of the mixing of the starting components finally contained therein. Thus, for example, the step of forming the first multicomponent system can, at least in the case of reactive colorant as filler, further include a step of bringing together at least a part of the second primary component and the tertiary component. To such extent, the method includes finally also at least one step of bringing together the secondary component and tertiary component, as well as at least a part of the second primary component, for forming the first multicomponent system. The step of bringing together second primary component and tertiary component should in such case, however, precede the step of bringing together the secondary component and the tertiary component, in order to be able to prevent with certainty a reacting of the second primary component with the secondary component. Accordingly, thus also the step of bringing together of secondary component and tertiary component, as well as at least a portion of the second primary component occurs after at least a portion of the second primary component and the tertiary component have been mixed together. In each case, however, in the manufacture of the first multicomponent system, no matter what the particular timing might be, secondary component and tertiary component are at least partially brought together. Moreover, the second multicomponent system ABCF can, finally, be formed by bringing together the first multicomponent system with the two primary components. For example, the two primary components can be added simultaneously to the first multicomponent system.

For the already mentioned case in which the in-line measuring device is also to serve for measuring, during operation, fluids which are subjected to increased requirements as regards chemical, biological, as well as also bacteriological purity, such as e.g., drinking water, it is also possible or, more likely, obligatory to avoid, as much as possible, for the manufacture of the polyurethane used for the liner, the provision of a heavy-metal-containing and/or an amine-containing catalyst, even though these types of catalysts would be very advantageous for the manufacture of polyurethane because of their good reactivity. Instead of these, it is advantageous to use for the manufacture of the liner also a polyurethane which, as proposed in the above mentioned, and to such extent serving here as a reference, German patent application DE102005005195.2, is formed with the help of a catalyst containing an organometal compound; the content of the disclosure of the DE102005005195.2 is to be seen as belonging to the content of this application.

In an embodiment of the invention, the catalyst used for the manufacture of the polyurethane, therefore, contains organotin compounds, especially di(n-octyl)tin compounds; whereby, it is possible to assure that the tin (Sn) brought into the finished liner by way of the catalyst, and remaining there, is chemically bound chemically and/or physically in the liner itself and, as a result, lastingly embedded therein.

In an embodiment of the invention, the following organotin compound is used as catalyst C for the manufacture of the polyurethane for the liner 3:

$$C_{40}H_{80}O_4Sn \quad (1)$$

An especially advantageous catalyst for manufacture of the liner has proven to be, for example, di(n-octyl)tin dilaurate (DOTL), whose structure can be presented as follows:

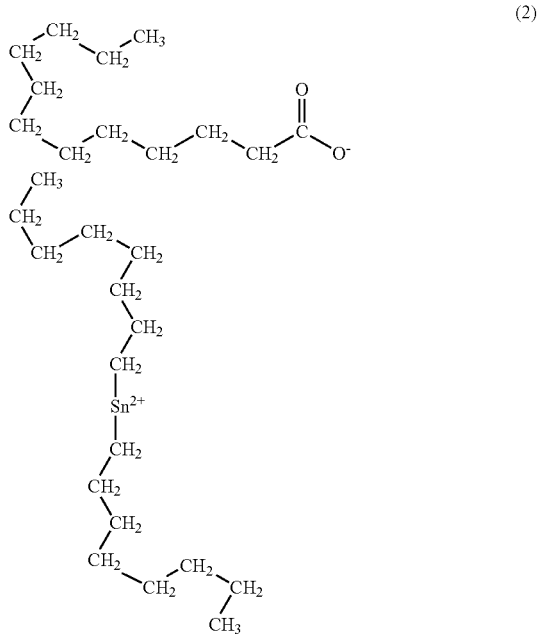

(2)

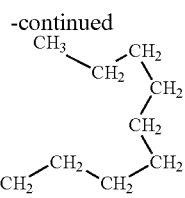

Moreover, it is also possible, for example, to use dioctyltin malinate or similar organometal compounds as catalysts for the manufacture of the liner.

By using oganometal compounds of the described kind as secondary component, the polyurethane is so formed that the metals (Me) brought into the liner with the catalyst and remaining there are bound chemically, especially atomically and/or physically, especially by crosslinking, to the carbon chains formed in the liner. An advantage of this catalyst is that its oganometal compounds are incorporated into the material of the liner in such a manner that, even under the action of water during operation of the in-line measuring device, they can be dissolved out of the liner, if at all, only in physiologically harmless, catalyst amounts and rates. As a result of the fact that the polyurethane used for the manufacture of the liner 3 is largely free of amine and heavy metals, the finished in-line measuring device meets even the very high, hygienic requirements set for applications in the drinking water field, especially also in comparison to other food applications. Investigations have, for example, shown that the migration rate ($M_{max,\ TOC}$) with respect to the total organic carbon content (TOC) can lie below 0.25 mg per liter and day, while for the chlorine demand rate ($M_{max,\ Cl}$) it is quite possible to achieve values of less than 0.2 mg per liter and day. As a result, the in-line measuring device of the invention can also satisfy, for example, the pertinent "Leitlinie zur hygienischen Beurteilung von Epoxidharzbeschichtungen im Kontakt mit Trinkwasser" ("Guideline for Hygienic Rating of Epoxy Resin Coatings in Contact with Drinking Water") on articles of equipment in the distribution network, especially also in main-lines, and/or the relevant NSF/ANSI Standard 61 for drinking water system components.

Additionally, it has been found that when using such organometal compounds as catalyst, not only are liners usable for drinking water applications manufacturable as already mentioned above, but also, in addition, the first multicomponent system used therewith can be storable to a degree sufficient for the manufacturing process, both in the case where reactive colorants are used, as well as in the case of use of pigment colorants as the tertiary component. Thus, it has been determined, for example, for a multicomponent system manufactured with di(n-octyl)tin dilaurate, as well with PRINTEX® F 80 to determine decay times of more than eight weeks. Consequently, it is additionally provided in an embodiment of the method of the invention to extract from a charge of the first multicomponent system over a length of time of at least twenty-four hours, especially, however, of more than three days, for forming portions of the second multicomponent system. Accordingly, there is thus a lapse of at least twenty-four hours between the step of forming the first multicomponent system and the step of forming the second multicomponent system, especially, however, a lapse of more than three days.

In a further embodiment of the invention, the polyurethane produced on the basis of the second multicomponent system ABCF is an elastomer which at least in part has essentially the following structure:

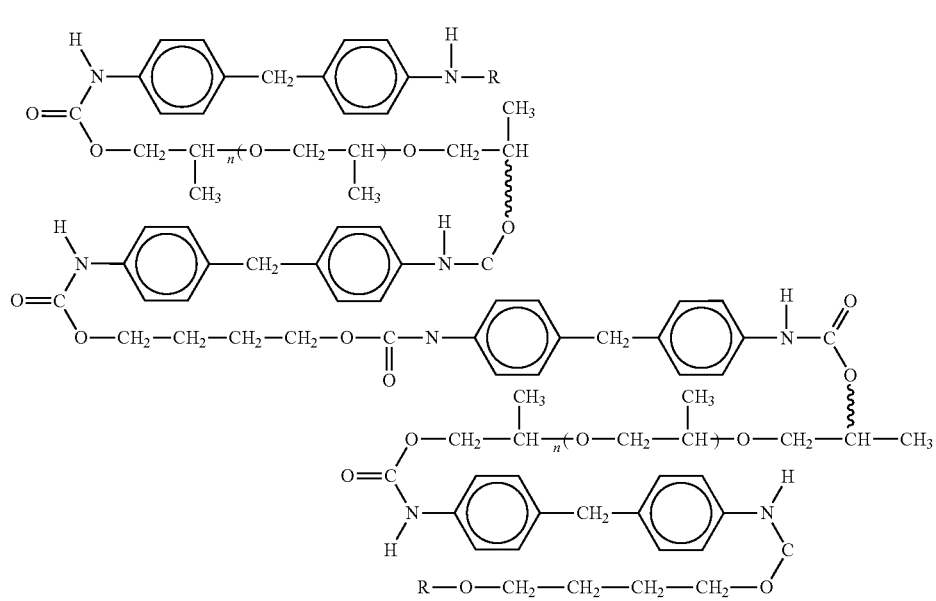

(3)

In a further embodiment of the invention, the alcohol used for the manufacture of the liner 3 is one having at least two functional OH groups, especially a diol. Especially good results are obtained in such case from the use of a butane diol.

Furthermore, prepolymers having aromatic or aliphatic, isocyanate groups, especially those with two or more reactive NCO groups, have shown themselves to be advantageous for manufacture of the liner 3.

In another embodiment of the invention, the prepolymer is, therefore, at least in part, constructed according to the following structural formula:

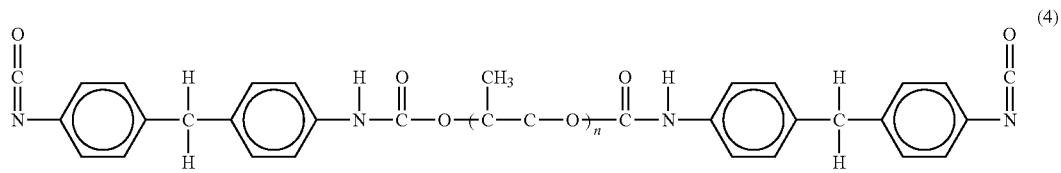

(4)

For producing such a prepolymer, a further development of the invention includes the use of a polypropylene oxide which is allowed to react with an aromatic diisocyanate, especially with an added excess thereof.

According to a further embodiment of the invention as the polypropylene oxide, a polypropylene glycol (PPG) is provided, whose simplified structure can be expressed about as follows:

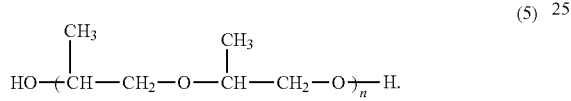

(5)

Alternatively to, or in supplementation of, the polypropylene oxide, for example, also a polytetramethylene ether glycol (PTMEG) with the following structural formula can serve for manufacture of the prepolymer:

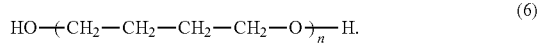

(6)

Moreover, alternatively or in supplementation, however, also other alphabetically structured glycol compounds can be used, having polymeric ether groups and terminal OH groups for manufacture of the prepolymer.

In another embodiment of the invention, the aromatic diisocyanate used for the manufacture of the prepolymer is a diphenylmethane-diisocyanate (MDI) especially one with at least one of the following structures:

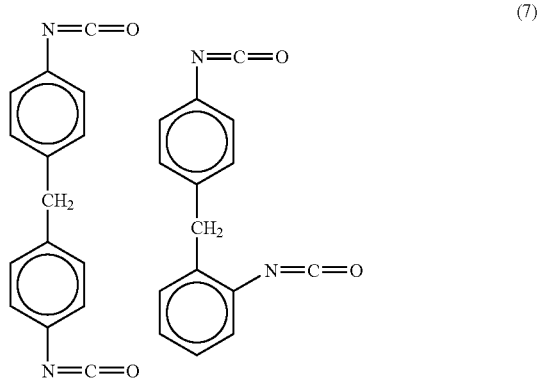

(7)

-continued

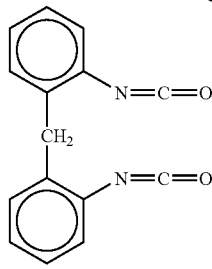

Experimental investigations have in such case further shown that, especially for the above described prepolymer systems (PPG+MDI and/or PTMEG+MDI), such short reaction times can already be achieved by addition of the catalyst serving as secondary component C at a mass fraction of less than 0.1% of the total mass of the second multicomponent system ABCF. Further investigations have additionally shown that especially good results can be achieved in the case of manufacture of the liner 3 when the alcohol serving as the second primary component B is added to the prepolymer serving as the first primary component A in a mixing ratio B:A of about 15:100 or less, especially a mixing ration B:A of less than 10:100.

Due to the use of polyurethane as material for the liner 3, the measuring tube 1 can, without more, be manufactured with nominal diameters in the range between 25 mm and 2,000 mm. Equally, it is possible, consequently, to assure, especially also when using the above described ribbon flow method for the manufacture of the liner 3, that the liner 3 has a thickness as uniform as possible, of less than 5 mm, especially less than 3 mm.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A method for producing a liner internally coating a support tube serving as a component of an in-line measuring device, said liner manufactured of a plastic composed of at least four starting components, of which at least a first primary component and a second primary component can react with one another, wherein a chemical reaction of the first primary component with the second primary component is accelerated by the addition of at least one secondary component serving as catalyst, and wherein at least one tertiary component serves as a filler, said method comprising the steps of:

forming a first multicomponent system, which serves as an intermediate component and contains, at least in part, both the secondary component as well as also the tertiary component;

forming, from at least apart of the first multicomponent system, a second multicomponent system, which is flowable, wherein the second multicomponent system contains the four starting components in concentrations enabling the chemical reaction at least of parts of the two primary components;

applying the second multicomponent system onto an inner wall of said support tube; and allowing the primary component and the second primary component contained in said second multicomponent applied onto the inner wall of the support tube, to react at least partially with one another.

2. The method as claimed in claim 1, wherein:
said step of forming the first multicomponent system further includes a step of bringing together the secondary component and the tertiary component.

3. The method as claimed in claim 1, wherein:
said step of forming a first multicomponent system further includes a step of bringing together at least a portion of the second primary component and the tertiary component.

4. The method as claimed in claim 1, wherein:
said step of forming the first multicomponent system further includes a step of bringing together the secondary component and the tertiary component, as well as at least a portion of the second primary component.

5. The method as claimed in claim 4, wherein:
said step of bringing together the secondary component and the tertiary component, as well as a portion of the second primary component occurs after at least a portion of the secondary primary component and the tertiary component have been mixed together.

6. The method as claimed in claim 1, wherein:
said step of forming the second multicomponent system further includes a step of, especially simultaneously, bringing together the first multicomponent system with the two primary components.

7. The method as claimed in claim 1, wherein:
said step of forming the second multicomponent system further compromises a step of adding, especially simultaneously, the first primary component as well as the second primary component to the first multicomponent system.

8. The method as claimed in claim 1, further comprising the steps of:
placing at least one charge of the first multicomponent system in a storage container; and
applying the at least one charge for forming a plurality, especially a sequence, of portions of the second multicomponent system by means of volume portions taken from the charge of the first multicomponent system.

9. The method as claimed in claim 8, wherein:
the charge of the first multicomponent system is applied over a period of time of more than three days for forming the portions of the second multicomponent system.

10. The method as claimed in claim 1, wherein the support tube, is a metal support tube.

11. The method as claimed in claim 10, wherein: the two primary components are allowed to react with one another at an ambient temperature of less than 100° C.

12. The method as claimed in claim 1, wherein:
between the step of forming the first multicomponent system and the step of forming the second multicomponent system, at least twenty-four hours pass.

13. The method as claimed in claim 1, wherein:
a prepolymer serves as primary component and an alcohol, serves as second primary component.

14. The method as claimed in claim 1, wherein:
the primary component contains ether groups.

15. The method as claimed in claim 1, wherein:
the primary component contains isocyanate groups.

16. The method as claimed in claim 15, wherein:
the primary component contains reactive NCO-groups.

17. The method as claimed in claim 1, wherein:
the second primary component contains functional OH-groups.

18. The method as claimed in claim 17, wherein:
the second primary component comprises a diol.

19. The method as claimed in claim 1, wherein:
the secondary component contains oganometal compounds.

20. The method as claimed in claim 19, wherein:
the secondary component contains organotin compounds.

* * * * *